United States Patent [19]

O'Neill et al.

[11] Patent Number: 5,078,338
[45] Date of Patent: Jan. 7, 1992

[54] MEANS FOR MAINTAINING A DESIRED RELATIONSHIP BETWEEN ROLL AND YAW STABILITY IN A SWEPT-WING AIRCRAFT BY VARYING DIHEDRAL AS A FUNCTION OF LIFT COEFFICIENT

[76] Inventors: Terrence O'Neill; Timothy O'Neill, both of 791 Livingston St., Carlyle, Ill. 62231

[21] Appl. No.: 467,534

[22] Filed: Jan. 19, 1990

[51] Int. Cl.$^5$ .............................................. B64C 3/38
[52] U.S. Cl. ........................................ 244/47; 244/46
[58] Field of Search ............... 244/45 R, 47, 38, 46, 244/91, 76 C

[56] References Cited

U.S. PATENT DOCUMENTS

| | | | |
|---|---|---|---|
| 2,120,760 | 6/1938 | Lumiere | 244/91 |
| 2,397,526 | 4/1946 | Bonbright | 244/91 |
| 2,562,905 | 8/1951 | Gadeberg | 244/91 |
| 2,721,046 | 10/1955 | Leitch | 244/47 |
| 4,247,062 | 1/1981 | Brueckner | 244/91 |
| 4,538,779 | 9/1985 | Goldstein | 244/91 |
| 4,722,499 | 2/1988 | Klug | 244/91 |

FOREIGN PATENT DOCUMENTS

1283097 11/1968 Fed. Rep. of Germany ........ 244/91
723529 2/1955 United Kingdom ............. 244/76 C

Primary Examiner—Joseph F. Peters, Jr.
Assistant Examiner—Anne E. Bidwell
Attorney, Agent, or Firm—Haverstock, Garrett & Roberts

[57] ABSTRACT

An assembly for controlling the lateral stability of a swept-wing aircraft by varying the geometric dihedral of the wing as a function of the wing's lift coefficient, such assembly including a mechanism for producing a signal or other type response representative of the lift coefficient of the wing at any particular point in time during flight including changes in such lift coefficient due to changes in the particular flight condition or aerodynamic characteristics of such wing, and a mechanism responsive to such signal or other response for controlling and activating movement of variable dihedral panels associated with the respective opposite portions of the wing. Movement of the variable dihedral panels changes the geometric dihedral of such wing in direct response to changes in the wing's lift coefficient and this enables one to maintain the overall effective dihedral of the aircraft, and consequently, the rolling moment stability coefficient, relatively constant throughout the entire flight envelope of the aircraft.

23 Claims, 4 Drawing Sheets

MEANS FOR MAINTAINING A DESIRED RELATIONSHIP BETWEEN ROLL AND YAW STABILITY IN A SWEPT-WING AIRCRAFT BY VARYING DIHEDRAL AS A FUNCTION OF LIFT COEFFICIENT

The present invention relates to a means for maintaining the desired aerodynamic roll and yaw stability characteristics for a swept-wing aircraft throughout its entire flight envelope and, more particularly, to several embodiments of a mechanism which senses changes in the lift coefficient of the wing and, based upon such lift coefficient changes, energizes means for deflecting movable dihedral panels associated with each wing section. Movement of the variable dihedral panels in response to changes in the lift coefficient of the airfoil maintains a relatively constant overall effective dihedral which, in turn, maintains a relatively constant rolling movement coefficient. Since the overall effective dihedral of an aircraft varies from the geometric dihedral of the wing with changes in lift coefficient, the present invention enables the dihedral of the wing itself to be varied so as to maintain the aircraft's overall effective dihedral and its correlated roll stability derivative in a proper, desired proportion to the relatively unchanging yaw or directional stability coefficient. Since the lift coefficient of an airfoil is directly proportional to the normally used angle-of-attack range of such airfoil, the lift coefficient input to the present system can be derived from one or more angle-of-attack sensing vanes or an equivalent input can be obtained from the longitudinal pitch trim control mechanism of the aircraft. Also, additional lift coefficient inputs can be obtained from the use of any auxiliary device that will affect and/or change the lift curve such as through the use of flaps, leading edge slats, boundary layer control and other lift control devices. Such auxiliary type devices are essentially movable elements that permit the pilot to change the geometry and aerodynamic characteristics of the wing sections to control the motion of the airplane or to improve the performance in some desired manner.

BACKGROUND OF THE INVENTION

Regardless of the particular type, function and configuration of an aircraft, one must always design an aircraft with a certain and preferably optimum degree of static and dynamic stability and control in all degrees of freedom. The particular amount of pitch, roll and yaw stability will depend upon the particular use and application for which the aircraft is being designed. Ordinarily, optimum performance characteristics throughout the entire flight envelope and, more particularly, at the low speed and high speed extremes of such envelope, are extremely difficult to achieve since designs directed to the attainment of optimum performance at such extremes are somewhat incompatible. The traditional design approach normally involves selecting one particular flight condition or a portion of the flight envelope such as cruise flight, high speed flight, climb characteristics, or range, and then designing the aircraft to achieve the desired stability characteristics by establishing a particular size, shape and configuration which optimizes stability for this particular flight condition or region. Obviously, stability and control optimization in one region of the flight envelope will not necessarily produce optimization in other regions of the flight envelope and therefore the resulting design choice must necessarily represent a compromise selected on the basis of yielding the best overall performance characteristics throughout the entire flight envelope.

As with longitudinal and directional stability, an optimum degree of lateral stability throughout the entire flight envelope is advantageous. This may be accomplished by use of dihedral in the design of the wing geometry. Lateral stability involves maintaining control over the rolling moments about an aircraft's longitudinal axis. The major control over the rolling moments associated with a particular aircraft design is usually an aileron system which, when deflected assymmetrically, will alter the wings' spanwise lift distribution in such a way that a net rolling moment is created. However, and importantly, a secondary control over an aircraft's rolling moments can be obtained through control over the sideslip angle since, for certain wing geometries, sideslip will likewise alter the wings spanwise lift distribution to create a net rolling moment. The phenomenon of rolling moment due to sideslip is defined as dihedral effect. An aircraft is said to have stable dihedral effect if a negative rolling moment is created as the result of positive sideslip. This definition is somewhat arbitrary but springs from the fact that stable dihedral effect is required for complete dynamic lateral or roll stability. Incorporation of dihedral into wing surfaces therefore provides an additional means of obtaining control over the rolling moment due to sideslip.

Figure 1:
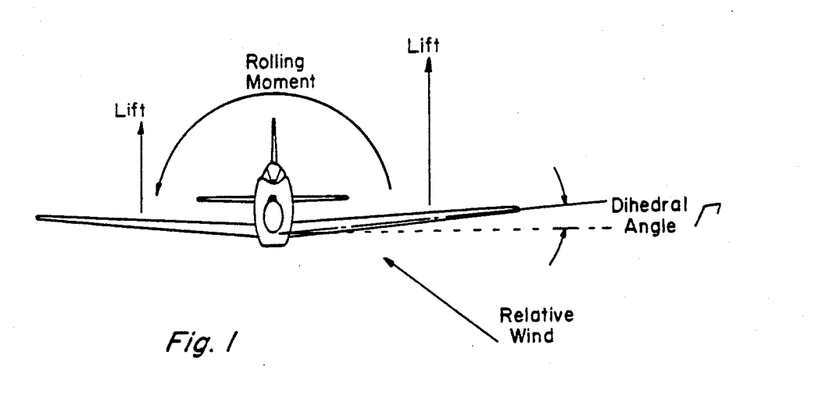
FIG. 1 is a front elevational view of an aircraft illustrating the geometric dihedral angle of a particular wing as well as the rolling moment produced by sideslip.

The rolling moment due to sideslip is mainly created by the wing dihedral angle $\Gamma$ which is positive when the wing tip chord lies above the root chord. The dihedral angle associated with an aircraft is illustrated in FIG. 1 and represents the angle between the horizontal and a line midway between the upper and lower surfaces of the wing as indicated. In a sideslip, the angle-of-attack of the forward wing will be higher than the angle-of-attack of the trailing wing thereby creating a lift on the leading wing that will be greater than the lift on the trailing wing. This creates a rolling moment about the longitudinal axis of the aircraft as illustrated in FIG. 1. The dihedral effect is measured by the change in rolling moment coefficient $C_l$ per degree change in sideslip angle $\beta$. The criterion of dihedral effect is the slope of the curve of rolling moment coefficient plotted against yaw or sideslip and is given as the derivative $dC_l/d\beta$. The value of this derivative varies almost directly with wing dihedral angle at the approximate rate of $DC_l/d\beta = 0.0002 \, \Delta\Gamma$. In evaluating a wind or a whole aircraft to obtain the total value of $dC_l/d\beta$, the term effective dihedral is used. One degree of effective dihedral corresponds to a value of $dC_l/d\beta = -0.0002/\text{deg}$.

Figure 2:
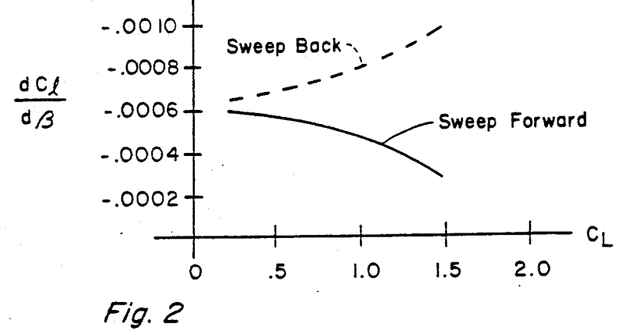
FIG. 2 is a graph illustrating typical variations of the rolling moment derivative or dihedral effect parameter with respect to lift coefficient for both a swept-back wing as well as a swept-forward wing.

It has been found that dihedral effect will be somewhat invarient with change in wing angle-of-attack for straight wings, but will change rapidly with angle-of-attack for swept wings. The effect of deflected flaps on dihedral effect can likewise be large if the flap hinge line has any sweep. The dihedral effect for aircraft having swept-wing planforms therefore becomes a function of lift coefficient. This means that aircraft with swept-back wings will have an increasing dihedral effect with corresponding increases in lift coefficient, while aircraft with swept-forward wings will have a decreasing dihedral effect. Typical variations in the rolling moment derivative or dihedral effect parameter $dC_l/d\beta$ with respect to lift coefficient are illustrated in FIG. 2 for the case of a swept-forward and swept-back wing. For example, if the geometric dihedral of the swept-back wing airplane is set to yield a desired $dC_l/d\beta$ value at a low lift coefficient, that is, at high speed or negative pitch, then the aircraft with a swept-back wing will be in danger of having excessive effective dihedral when operating at high lift coefficients, that is, at low speeds or +G maneuvering, while the aircraft with a sweptforward wing will most probably encounter negative dihedral effect at high lift coefficients, that is, at low speeds. To estimate the overall effective dihedral for an aircraft, then, requires considerable experience in allowing for many complex variables.

Since the dihedral effect for swept-wing aircraft is tied to the lift coefficient of the wing, swept-wing aircraft encounter a different problem regarding roll-yaw stability as compared to a straight wing aircraft. This is because the aerodynamic coefficients of roll stability do vary from the on-design condition when the swept wings' lift coefficient varies from the on-design lift coefficient. The result is that the swept-back wing design has too much effective dihedral at higher-than-design lift coefficients, that is, low speed flight, and too little effective dihedral at the lower-than-design lift coefficients, that is, high speed flight. In other words, wing sweep contributes to the total aircraft effective or aerodynamic dihedral, and consequently the roll stability coefficient, and such effective dihedral changes as the lift coefficient of the wing is changed. This is not true of aircraft equipped with straight or unswept wings since the effective dihedral of such wing designs does not change as the lift coefficient changes. Since roll and yaw stability are related to one another, their coefficients must remain proportionate in order for the aircraft to remain roll-yaw stable. Sweep of the wing varies the roll coefficient, but does not significantly effect the yaw coefficient. Therefore, as the lift coefficient of a swept wing changes from its on-design value, the aircraft's roll-yaw stability degrades. As a result, swept-wing aircraft are roll-yaw stable only at the on-design criteria or selected lift coefficient and other means are utilized to provide stability throughout the remainder of the design envelope.

The present invention ties dihedral to the lift coefficient of a swept wing and varies the geometrical dihedral of such wing in relationship to the change in lift coefficient so as to obtain the desired roll-yaw stability throughout the entire flight envelope. While it is known that variable dihedral wings are disclosed in the prior art, for example, see U.S. Pat. Nos. 2,721,046 and 2,915,261, none of the known prior art designs tie the change in dihedral angle to the change in the lift coefficient of the airfoil, and none disclose means responsive to such changes in the airfoil lift coefficient for effecting a change in the geometric dihedral of the swept-wing aircraft so as to maintain a desired roll-yaw stability relationship as will be hereinafter explained.

SUMMARY OF THE INVENTION

The present invention teaches the construction and operation of several embodiments of a mechanism for changing the geometric dihedral associated with a swept-wing aircraft in relationship to the change in lift coefficient as the wing is maneuvered through the particular flight or design envelope. Inflight lift coefficient data can be derived from several sources. For example, such data can be correlated directly from an angle-of-attack sensing vane which constantly measure and displays the angle-of-attack of the airfoil in relationship to the relative wind. Also, since the pitch trim control mechanism selects the wings' trim lift coefficient, lift coefficent data can likewise be derived and correlated with respect to a particular pitch trim setting at any particular point in time during flight. Still further, lift coefficient data can also be derived and correlated from the activation of any auxiliary device which will directly affect or change the lift coefficient of the airfoil such as flaps, slats, spoilers, boundary layer control means and other such lift control type devices. Input from any or all of the above-mentioned means from which lift coefficient data can be derived is then transformed so as to correspondingly and proportionately move variable dihedral panels attached to the outboard portion of each respective wing, such panels being deflected to a degree necessary so as to maintain the roll-yaw stability characteristics desired. Movement of the variable dihedral panels in response to lift coefficient changes may be accomplished through mechanical, electrical, electro-magnetic, hydraulic, pneumatic or other means and several linkage arrangements for accomplishing this task are disclosed hereinafter.

One such method for tying together changes in airfoil lift coefficient with movement of the present variable dihedral panels is through a mechanical linkage mechanism which is mechanically tied to the pitch trim setting of the aircraft. In this particular arrangement, movement of the pitch trim mechanism in response to pilot input in turn causes movement of an apportioning device which is tied through additional mechanical means to the control horn or some type of actuator means associated with each respective variable dihedral panel. Movement of the apportioning device causes appropriate movement of the dihedral panel control horn or associated actuator means thereby deflecting the dihedral panels either up or down depending upon the movement of the pitch trim mechanism. Since changes in the pitch trim setting correspond to changes in the lift coefficient of the swept-wing airfoil, such incremental itch trim changes can be calibrated to produce a corresponding incremental change in the position of the dihedral panels. Such calibration is based upon keeping the overall effective dihedral of the aircraft constant and can be accomplished by solving well known stability equations relating rolling moment to effective dihedral, wing sweep, and lift coefficient.

For example, the dihedral to lift coefficient proportions may be established through the use of the following equations:

Equation 1:

$$\Gamma_{eff} = \frac{dC_l/d\beta}{-.0002}$$

where
$\Gamma_{eff}$=effective dihedral
$dC_l/d\beta$=rolling moment derivative
$Cl$=rolling moment coefficient
$\beta$=sideslip angle Equation 2:

$$dC_l/d\beta = [-2\,\Gamma/57.3 \times dC_L/da \times \bar{y}/b \times S_{tot}/S] \times [-C_L/57.3 \times \bar{y}/b \times \sin 2\Lambda \times S_{tot}/S]$$

where
$\Gamma$=geometric dihedral
$C_L$=lift coefficient
$\alpha$=angle-of-attack $dC_L/d\ \alpha$ = rate of change of lift coefficient with respect to angle-of-attack (lift curve slope)
$\overline{y}$ = spanwise distance from wing centerline to the centroid of area of wing panel having dihedral
b = wing span (half wing)
$S_{64}$ = area of wing panel having dihedral
S = area of entire half wing
$\Lambda$ = sweep angle of wing
Equation 3:

$$dC_l/d\beta = [-2\ \Gamma_1/57.3 \times dC_L/d\alpha \times \overline{y_1}/b \times S\Gamma_1/S] +$$
$$[-2\ \Gamma_2/57.3 \times dC_L/d\alpha \times \overline{y_2}/b \times S\Gamma_2/S] +$$
$$[-C_L/57.3 \times \overline{y_1}/b \times \sin 2\Lambda \times S\Gamma_1/S] +$$
$$[-C_L/57.3 \times \overline{y_2}/b \times \sin 2\Lambda \times S\Gamma_2/S]$$

where
$\Gamma 1$ = dihedral of inner wing panel
$\Gamma 2$ = dihedral of outer wing panel
$\overline{y}1$ = spanwise distance from wing centerline to the centroid of area of inner wing panel
$\overline{y}2$ = spanwise distance from wing centerline to the centroid of area of outer wing panel
$S\Gamma_1$ = area of inner wing panel having dihedral
$S\Gamma_2$ = area of outer wing panel having dihedral By holding the effective dihedral of the aircraft constant, the appropriate amount of deflection of the dihedral panels can be calculated for each incremental change in lift coefficient from the above-identified equations. As can be seen from equation 1, by holding the effective dihedral of the aircraft constant, we are likewise holding the rolling moment derivative $dC_l/d\beta$ constant. Equation 3 can be used to determine the dihedral angle $\Gamma_2$ of the movable outboard panels needed to maintain the desired rolling moment derivative $dC_l/d\beta$ at a particular lift coefficient $C_L$. The apportioning device or other equivalent means associated with the present mechanism can therefore be accurately calibrated, programmed or constructed so as to produce the proper amount of dihedral panel deflection necessary to maintain the desired rolling moment coefficient.

In this particular embodiment of the present invention, it is important to remember that since this particular mechanical linkage arrangement changes dihedral angle only in response to movement of the pitch trim control device, such arrangement moves and adjusts the wing's dihedral panels proportionately as the pilot changes the wings' trim position to a different lift coefficient. This maintains roll-yaw stability during trimmed flight only and therefore leaves off-trim events to be corrected by the pilot through use of the flight control surfaces to correct for off-trim maneuvering, gusts, and so forth. In this regard, it is also anticipated and recognized that other lift coefficient inputs could be mechanically tied to the apportioning device or other such means so as to effect proportional movement of the dihedral panels in response to such additional changes in the wings' lift coefficient. It is also recognized that deflection of the dihedral panels can likewise be accomplished through electrical, hydraulic, electro-magnetic, pneumatic or other means.

Another embodiment of the present invention illustrates other means for changing the geometric dihedral of a swept-wing aircraft based upon changes in lift coefficient derived from an angle-of-attack sensing vane. Additional means for correcting any distortion of the lift coefficient data received from the angle-of-attack vane as well as inputting lift coefficient data from other auxiliary devices is likewise disclosed and discussed hereinafter. More complicated system arrangement to include lift coefficient inputs from deflection of the maneuvering control surfaces of the aircraft are likewise recognized and anticipated.

Regardless of the exact mechanism or system for accomplishing movement of the present dihedral panels in response to lift coefficient data, the importance of the present invention lies in the fact that movement of the variable dihedral panels is linked to and based upon changes in the wings' lift coefficient. The present invention includes means for producing a signal or other type response which is representative of the lift coefficient of the aircraft's wing at any particular point in time during flight including changes in such lift coefficient due to changes in the flight condition or aerodynamic characteristics of such wing, and it also includes means responsive to such signal or other response for actuating movement of the variable dihedral panels to change the geometric dihedral of the wing in direct response to changes in the lift coefficient of the wing. This maintains the effective dihedral of the aircraft relatively constant and results in maintenance of a substantially constant rolling moment coefficient throughout the entire flight or design envelope of the aircraft.

Another important aspect of the present invention relates to performance. Normally, the usual penalty associated with correcting the roll-yaw stability problem inherent with swept-wing aircraft designs involves either the use of an extra large tail or empennage section which produces more drag and less performance, or the use of gyro-sensing or other complex devices to correct for the instability caused by the change of effective dihedral due to wing sweep. This is not true of the present invention since the present means does not require any additional drag-producing surface area, but instead, uses the existing surface area of the wing, namely, the movable dihedral panels themselves which form a portion thereof, to compensate for and correct the above-noted instability. The present means therefore maintain the proper or desired effective dihedral throughout the entire flight envelope by using the problem-inducing variable itself, namely, the change in lift coefficient, to drive the correcting devices.

It is therefore a principal object of the present invention to control the roll stability in a swept-wing aircraft by varying the geometric dihedral of the airfoil as a function of lift coefficient throughout the entire flight or design envelope.

Another object is to provide means for deflecting movable dihedral panels associated with the respective portions of a wing based upon corresponding changes in lift coefficient.

Another object is to teach the construction and operation of a mechanism which links changes in the aircraft's lift coefficient to automatic movement of hingedly attached dihedral panels to keep the effective dihedral of the aircraft substantially constant throughout at least a portion of the flight envelope.

Another object is to teach the construction and operation of a mechanism for varying the dihedral of a swept-wing aircraft as a function of lift coefficient by deriving such lift coefficient data from either the pitch trim control mechanism of the aircraft or an angle-of-attack sensing vane.

Another object i to provide for the automatic operation of the dihedral varying mechanism based upon changes in the lift coefficient of the airfoil.

Another object is to teach several alternative methods for coupling changes in the lift coefficient of the airfoil to changes in the angular position of the movable dihedral panels.

Another object is to provide a means for varying the geometric dihedral of a swept-wing aircraft as a function of lift coefficient in order to maintain the roll stability derivative in a desired relationship relative to the relatively unchanging yaw stability derivative.

Another object is to provide a means for controlling the roll-yaw stability of a swept-wing aircraft without increasing drag and reducing the overall performance of the aircraft.

These and other objects and advantages of the present invention will become apparent to those skilled in the art after considering the following detailed specification in conjunction with the accompanying drawings.

DETAILED DESCRIPTION OF THE INVENTION

Figure 3:
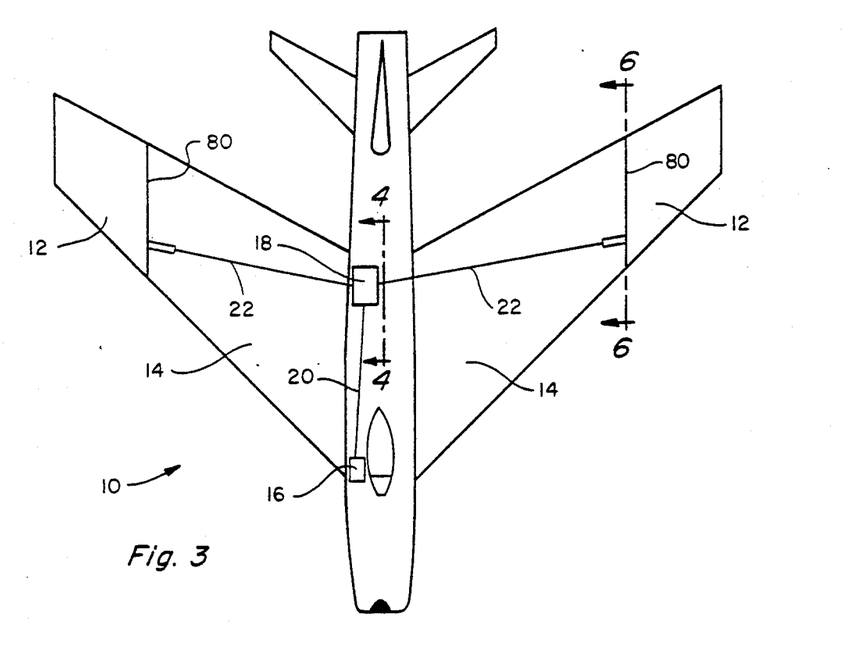
FIG. 3 is a top plan view of a swept-wing aircraft showing the arrangement of various components associated with one embodiment of the present invention.

Referring to the drawings more particularly by reference numbers wherein like numerals refer to like parts, number 10 in FIG. 3 identifies a swept-wing aircraft illustrating, in block diagram form, the arrangement of the various components associated with one particular embodiment of the present invention. The aircraft 10 is representative of a typical swept-wing aircraft and, although it is recognized and anticipated that the present invention may be incorporated into a particular aircraft in many different ways and in a wide variety of component arrangements, the arrangement illustrated in FIG. 3 is by way of illustration and exemplification only.

With the above in mind, the present system of FIG. 3 includes a pair of angularly movable outboard variable dihedral wing panels 12, each panel 12 being respectively hingedly attached to the outboard end portion of one of the wing portions 14, one dihedral panel 12 being associated with the left wing 14 and the other panel 12 being associated with the right wing. As will be hereinafter further explained, each dihedral panel 12 is operatively pivotally movable about a wing hinge line 80 through actuator means 24 (FIGS. 4 and 5), or other appropriate means such as the actuator means 60 (FIG. 7A) associated respectively therewith. In this particular embodiment, lift coefficient data is inputted to the present system through activation by the pilot of the pitch trim control mechanism. Such activation is accomplished by movement of the pitch trim control switch or other activation means 16 located in the cockpit of the aircraft, which switch movement is sensed by an apportioning device 18 through transmission means illustrated by line 20 in FIG. 3. The apportioning mechanism 18 is in turn tied to and directly controls movement of the respective control horns 59 of each wing dihedral panel 12 (FIG. 7) through additional transmission means illustrated by line 22 in FIG. 7. In other words, activation of the pitch trim control switch 16 or other pitch trim control activation mechanism in response to the pilot's input produces a signal or other response which is received by the means 18 and, in response to such signal or other input, the means 18 causes appropriate movement of each respective dihedral control horn 59 thereby deflecting the panels 12 either up or down depending upon the pitch trim input 16.

Figure 4:
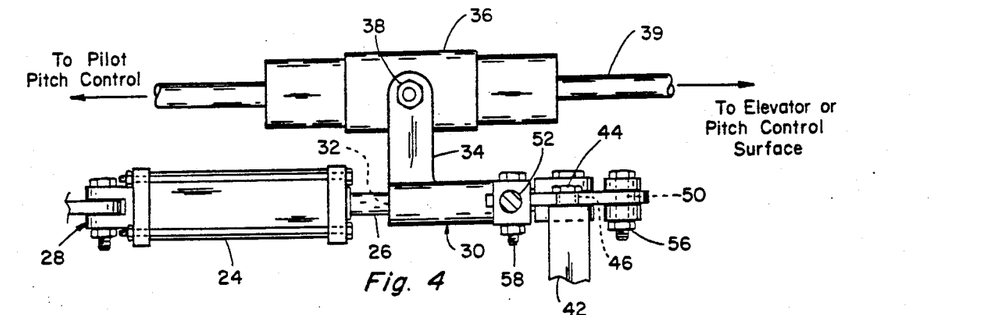
FIG. 4 is a partial cross-sectional view taken along the line 4—4 of FIG. 3 showing one arrangement for inputting lift coefficient data from the pitch trim mechanism of an aircraft to mechanical means for deflecting movable dihedral panels.
Figures 5, 7, 7A:
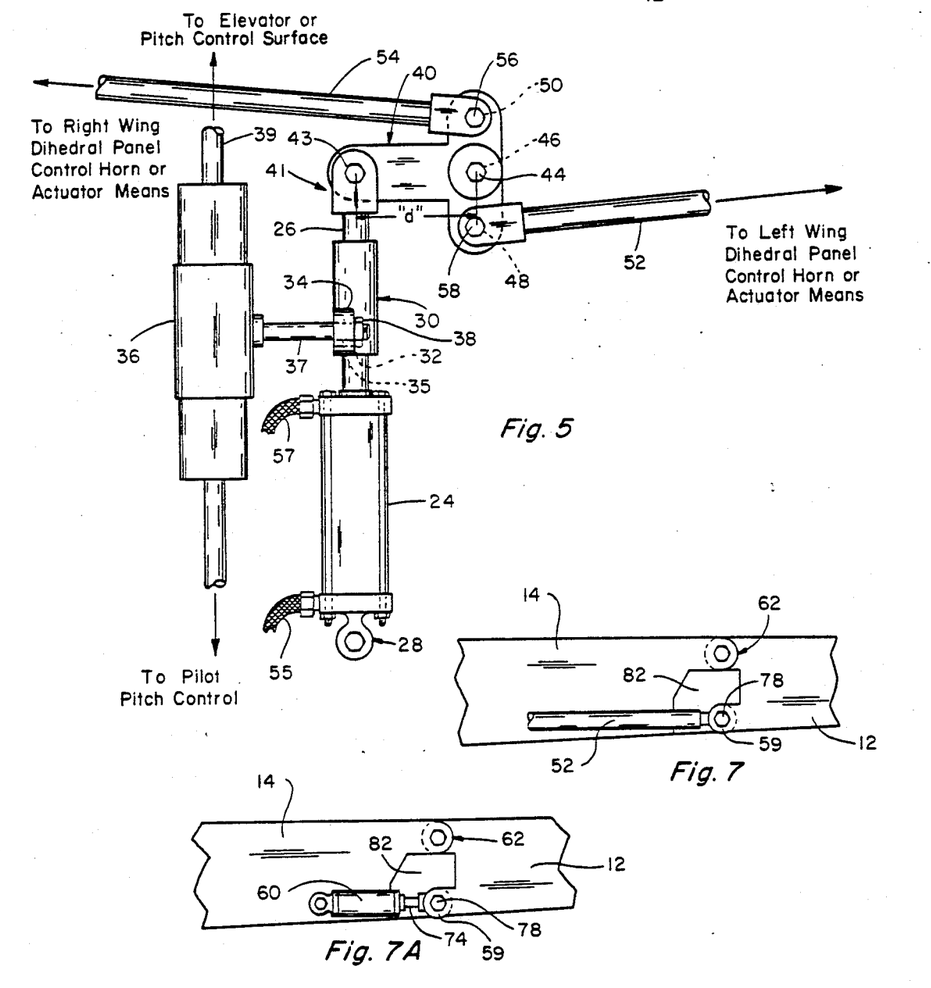
FIG. 5 is a top plan view of the apportioning means illustrated in FIG. 4.
FIG. 7 is a partial cut-away front elevational view illustrating a simplified pivotal arrangement of the left dihedral panel.
FIG. 7A is a partial cut-away front elevational view illustrating another pivotal arrangement of the lift dihedral panel.

One specific arrangement for inputting lift coefficient data to the present system through movement of the pitch trim mechanism is illustrated in FIGS. 4 and 5. More particularly, movement of the pitch trim control means 16 (FIG. 1) activates movement of the actuator piston arm 26 associated with the pitch trim actuator 24. Such activation can be accomplished by well known means such as by having the control switch 16 electrically drive a common electric-hydraulic power pack which in turn hydraulically drives the actuator 24. In this event, hydraulic pressure would drive the reciprocating movement of the actuator piston arm 26. Mounting of the actuator 24 within the fuselage of the aircraft 10 is accomplished in a conventional manner such as by attaching the actuator 24 to the framework of the aircraft through mounting means 28. A sleeve or collar member 30 having a threaded bore 32 extending therethrough is threadably secured to the actuator arm 26 as illustrated in FIGS. 4 and 5. Although threaded engagement of the members 26 and 30 is illustrated, it is recognized and anticipated that other suitable means for fixedly attaching and securing the member 30 to the piston arm 26 may be utilized.

The sleeve or collar member 30 includes a flange extension portion 34 having cooperatively engageable means associated therewith for attaching the flange 34 to the pitch trim housing cage member 36 in a conventional manner. In the particular arrangement illustrated in FIGS. 4 and 5, the flange 34 includes an opening or bore 35 adaptable for insertably receiving an outwardly extending stud 37 associated with the member 36 as best shown in FIG. 5. Conventional fastening means such as fastening means 38 (FIG. 4) could be used to hold and secure the stud 37 in engagement with the flange 34. The pitch trim housing member 36 is specifically designed for reciprocal movement and further includes a passageway extending therethrough enabling the elevator push-pull control linkage 39 to be positioned and attached therethrough. The control linkage 39 is directly tied through additional trim system components (not shown) to the elevator control or other pitch control surface and any movement of the pitch trim cage member 36 will produce a corresponding movement of the pitch control surface depending upon the amount of pitch trim input 16 commanded by the pilot. Since the actuator means 24 is driven in response to the pilot's trim control switch 16, and since the actuator piston arm 26 is directly linked to the pitch trim cage member 36, activation of the pitch trim control switch 16 will cause reciprocal movement of the member 36 thereby setting the pitch control surface at a new angle and causing the wing to rotate to that new angle-of-attack and its corresponding lift coefficient.

As best shown in FIG. 5, the terminal end portion of the piston arm 26 is also fixedly secured to a bellcrank member 40 through well known means such as the connection arrangement illustrated at 41 in FIG. 5. The member 40 is substantially T-shaped in construction and is likewise fixedly secured in a conventional manner to the aircraft structure such as to the support member 42 shown in FIG. 4. In this regard, the bellcrank 40 is pivotally attached to the member 42 such as by the fastening member 44 (FIG. 4) which extends through a pivot opening 46 (FIG. 5), the opening 46 being centrally located on the T-portion of the bellcrank 40 as best shown in FIG. 5. The bellcrank 40 further includes a pair of apertures 48 and 50 located on opposite sides of the opening 46 as shown in FIG. 5. Transmission means from the bellcrank 40 to the left and right wing dihedral panel control horns 59 (FIG. 7) in the form of the linkage members 52 and 54 respectively are secured to the member 40 through the respective apertures 48 and 50. Securing and holding the transmission members 52 and 54 in engagement with the bellcrank 40 can be accomplished by any suitable means such as through the use of the fastening members 56 and 58 shown in FIGS. 4 and 5. As a result of this particular arrangement between the actuator means 24 and the bellcrank 40, reciprocal movement of the actuator piston arm 26, besides activating the pitch trim mechanism through movement of the pitch trim cage member 36, will also cause pivotal movement of the bellcrank 40 which, in turn, will cause movement of the transmission means 52 and 54. Since the transmission means or pushrod members 52 and 54 are attached directly to the respective control horns 59 associated with each dihedral panel 12 as best shown in FIG. 7, any movement of the members 52 and 54 will further cause appropriate movement of the control horns 59 for deflecting the dihedral panels 12 depending upon the movement of the piston arm 26 which is driven in direct response to the pitch trim changes inputted by the pilot. In this particular embodiment of the present invention, the bellcrank arrangement 40 and its coupling to the various components of the present system illustrated in FIGS. 4 and 5 corresponds to the apportioning device 18 identified in FIG. 3, whereas the linkage members 52 and 54 (FIGS. 4 and 5) correspond to transmission means 22 similarly identified in FIG. 3.

Activation of the pitch trim actuator means 24 may be accomplished hydraulically with the fluid supply and return lines 55 and 57 terminating at the expansible cylinder chamber of the actuator 24 as shown in FIG. 5. Also, as previously indicated, it is anticipated and recognized that the actuator 24 may likewise be controlled through mechanical, electrical, electro-magnetic, pneumatic or other means and the transmission lines 55 and 57 could be configured and adapted to carry the appropriate transmission media for activating the actuator 24 and controlling movement of the piston arm 26 associated therewith. Nevertheless, regardless of the exact mechanism or media used for actuating the pitch trim actuator 24, what is of critical importance to this particular embodiment of the present invention is that the pilot's activation of the pitch trim control switch 16 not only controls the pitch trim setting of the aircraft, but, importantly, it also controls movement of the bellcrank 40 thereby moving the respective control horns 59 to accomplish the correct amount of relative angular movement of the dihedral panels 12.

Figures 6, 10:
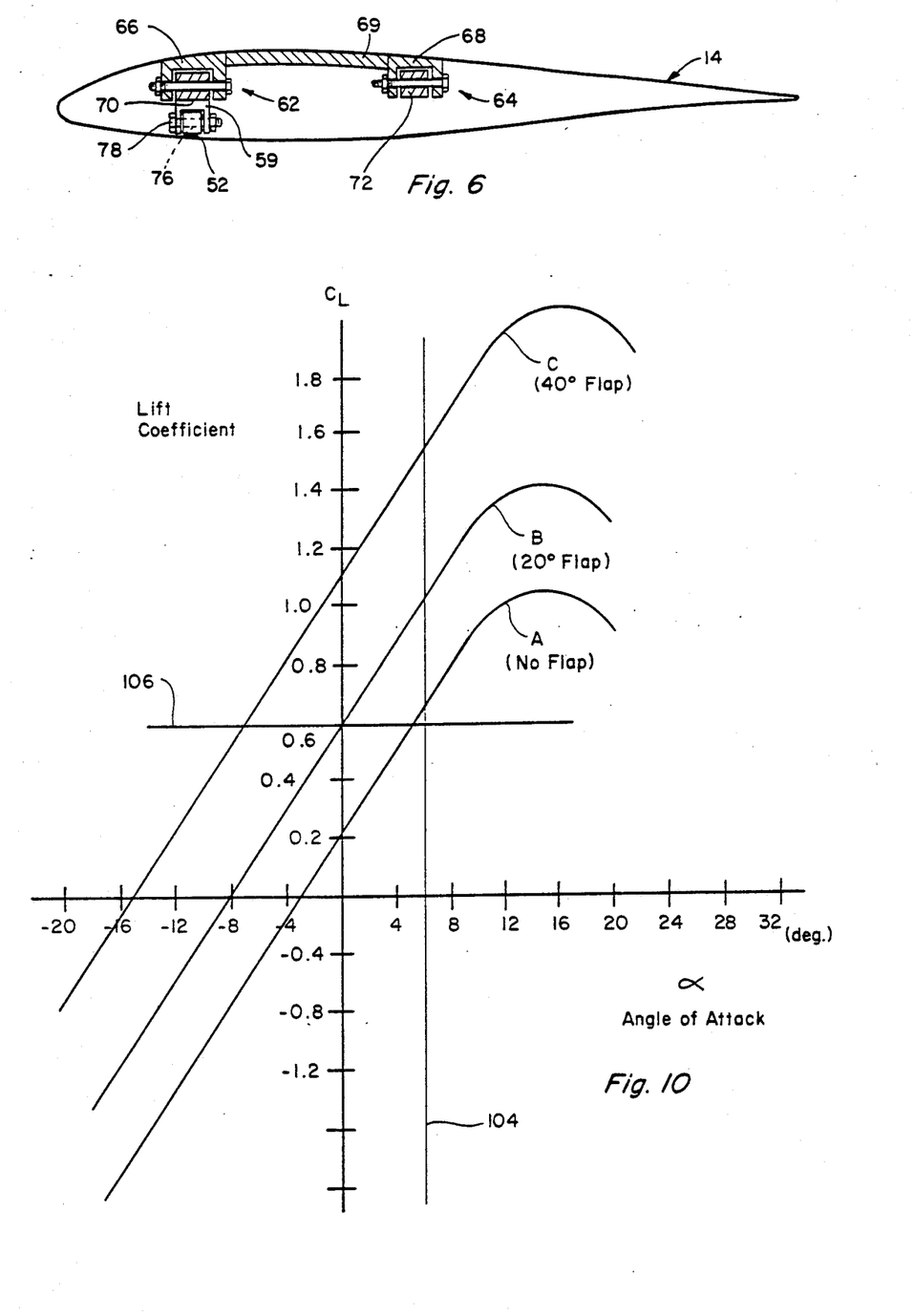
FIG. 6 is a cross-sectional view taken along line 6—6 of FIG. 3 showing the hinge mechanism for pivotally moving the left dihedral panel.
FIG. 10 is a typical plot of lift coefficient versus angle-of-attack for a particular airfoil showing the effects of flap deflection.

The hinging of the wing dihedral panels 12 to the main wing portions 14 and the positioning of the wing dihedral panel control horns 59 are best illustrated in FIGS. 6 and 7. As shown in FIG. 6 with respect to the left wing of the aircraft 10, the variable dihedral panel 12 is hinged along the upper portion of the main wing 14 at two separate locations, namely, hinge connection points 62 and 64. The hinge joints 62 and 64 will normally be associated with one of the spanwise extending spars or other equivalent main strength members associated with the particular inboard wing section such as the members 66 and 68 illustrated in FIG. 6. The members 66 and 68 are further strengthened by interconnecting member 69 to give additional support and stability to the connection joints 62 and 64. It is recognized that the members 66, 68 and 69 could likewise be of a one-piece construction so as to form a single, unitary hinge member. Each hinge joint also includes a hinge element or coupling member such as the members 70 and 72, the members 70 and 72 being associated with the outboard wing dihedral panel 12 and each having on end portion thereof bolted or otherwise attached to the main wing support structure such as to the members 66 and 68 as illustrated in FIG. 6. The lower end portion of the hinge coupling member 70 is substantially U-shaped in construction and forms the control horn 59 of the dihedral panel 12. It is recognized that the control horn 59 can be fashioned and made in a wide variety of shapes and configurations. In the embodiment illustrated in FIGS. 6 and 7, the control horn 59 is adapted to operatively receive the terminal end of the pushrod 52 a best shown in FIG. 7. The terminal end portion of the pushrod 52 may include a opening 76 extending therethrough adaptable to receive a bolt or other fastening member such as the member 78 illustrated in FIGS. 6 and 7. Reciprocal movement of the pushrod 52 causes pivotal movement of the dihedral panel 12 about the hinge joints 62 and 64, which hinge connections form the hinge line 80 illustrated in FIG. 3.

Extension of the linkage member or pushrod 52 outwardly from its neutral or in-line position as shown in FIG. 7 will angularly deflect the dihedral panels 12 upwardly, while retraction of the pushrod 52 inwardly from such position will angularly deflect the panels 12 downwardly. In this regard, a sufficient gap such as the gap 82 (FIG. 7) should exist between the lower portions of the main wing section 14 and the corresponding dihedral panel 12 so as to enable sufficient downward deflection of such panels within design limits without such members otherwise hindering or causing interference with each other. Although most of the above-discussed disclosure has been in relation to the left wing of the aircraft 10, it is understood that the right wing of such aircraft would incorporate a similar arrangement, the control horn and hinge mechanisms associated therewith being substantially a mirror image of the mechanisms described and shown in FIGS. 6 and 7. It is also recognized that other well known hinge constructions for pivoting the wing dihedral panels 12 about the main wing sections 14 are known in the industry and many of these prior art constructions such as the variable dihedral hinge mechanism illustrated in U.S. Pat. No. 2,721,046 may likewise be suitably adapted and used in conjunction with the present invention.

Operationally, as the pilot trims the aircraft for a particular flight condition, he/she accordingly manipulates the pitch trim control switch 16 within the cockpit as to cause activation of the pitch trim actuator 24 which in turn causes the actuator piston rod 26 to move in response to the pilot's pitch trim input. Movement of the piston rod 26 causes the pitch trim housing mechanism 36 to correspondingly move so as to trim the aircraft in pitch for that particular point in time during flight. This establishes a particular angle-of-attack for the aircraft by selecting the wing's trim lift coefficient for the angle-of-attack represented by that particular pitch trim setting. At the same time that the piston rod 26 is activating the pitch trim mechanism, the rod 26 is also pivotally moving the bellcrank 40 in response to the same pitch trim data being inputted by the pilot. Movement of the bellcrank 40 in turn causes relative movement of the transmission members 52 and 54, which movement drives the respective dihedral panels 12, through the respective control horns 59, to their proper position.

Since changes in the pitch trim setting correspond to changes in the lift coefficient of the airfoil 14, incremental pitch trim changes produced by movement of the piston rod 26 also produce corresponding incremental changes in the position of the dihedral panels 12. For example, if the aircraft is trimmed for a high lift coefficient, that is, a nose-up condition, the transmission members 52 and 54 will move the dihedral panels 12 downwardly so as to maintain the same overall effective dihedral of the aircraft. Similarly, if the aircraft is trimmed for a low lift coefficient, that is, a nose-down condition, the transmission members 52 and 54 will move the dihedral panels 12 an appropriate amount upwardly. As a result, lift coefficient data inputted through the pitch trim mechanism drives the bellcrank 40 to move the dihedral panels 12. The geometric dihedral of the wing 14 is therefore changed in relationship to changes in the wing's lift coefficient so as to maintain an overall effective dihedral of the aircraft. This results in maintenance of a substantially constant rolling moment coefficient as previously explained throughout the entire flight or design envelope of the aircraft.

The ratio of dihedral panel movement to angle-of-attack change, that is, pitch trim change, in this particular embodiment (FIGS. 4-7) is established by mechanical linkage. The exact amount of movement of the dihedral panels, either up or down, is controlled by the overall distance between the center of the pivot point 46 and the center of the connection point 43 where the piston rod 26 attaches to the bellcrank 40. This distance "d" can be determined based upon the calibration calculations previously described with respect to the known stability equations set forth above to maintain the effective dihedral-to-lift coefficient ratio desired for each flight condition. The geometry of the bellcrank 40 based upon the dimensions of the distance "d" between the connection points 43 and 46 will control the amount of movement of the members 52 and 54 which in turn will control the amount of movement of the dihedral panels 12. Also, since the bellcrank 40 is operating about a pivot point 46, the piston rod 26 may have to undergo a change of angularity when fully extended. This can be permitted by pivotally mounting the actuator 24 about the mounting means 28, if necessary. It is also recognized that the linkage distance "d" or equivalent means can be made to be variable in flight, for example, by providing means for adjusting or varying the distance "d" between the connection points 43 and 46.

Instead of connecting the transmission means 52 and 54 directly to the dihedral panel control horns 59 as illustrated in FIG. 7, depending upon the particular design application and other considerations such as the actual loads involved in maneuvering the panels 12, it is recognized that other means for effecting movement of the dihedral panels 12 may be necessary and can be adapted and utilized. For example, the actuator 60 illustrated in FIG. 7A could be used to drive each dihedral panel 12. In this particular arrangement, the transmission means 52 and 54 (FIG. 5) are each respectively connected to the left and right wing dihedral panel actuator 60 such that movement of the members 52 and 54 will cause appropriate movement of such actuators 60. In this regard, each actuator 60 includes a piston arm 74 having a terminal end portion adapted to cooperatively engage the respective control horns 59 as illustrated in FIG. 7A. This can be accomplished in a manner similar to the connection of pushrod member 52 to control horn 59 illustrated in FIG. 7, that is, by having the terminal end portion of the piston arm 74 include an opening (not shown) extending therethrough adaptable to receive a fastening member such as the member 78 shown in FIG. 7A. Reciprocal movement of the piston arm 74 causes pivotable movement of the dihedral panel 12 about the hinge joints 62 and 64 as previously described.

Like the pitch trim actuator 24, the dihedral wing actuators 60 can be activated via transmission means 52 and 54 (FIG. 5) through either mechanical, electrical, electro-magnetic, hydraulic, pneumatic or other means, the actuators 60 operating in a substantially similar fashion as that described with respect to the actuator 24. Extension of the piston arm 74 outwardly from its neutral or in-line position a shown in FIG. 7A will angularly deflect the dihedral panels 12 upwardly, while retraction of the piston arm 74 inwardly from such position will angularly deflect the panels 12 downwardly. Depending upon the exact system or media for activating the dihedral panel actuators 60, the transmission members 52 and 54 would accordingly activate appropriate power packs, motor means, valving or other means for effecting movement of the actuator piston arm 74. Operationally, movement of the bellcrank 40 causes relative movement of the transmission means 52 and 54, which movement activates the actuator means 60 associated with each respective dihedral panel 12 and drives such panels to their proper position. It is also recognized and contemplated that still other means for effecting movement of the dihedral panels could likewise be incorporated into the present invention.

Figure 8:
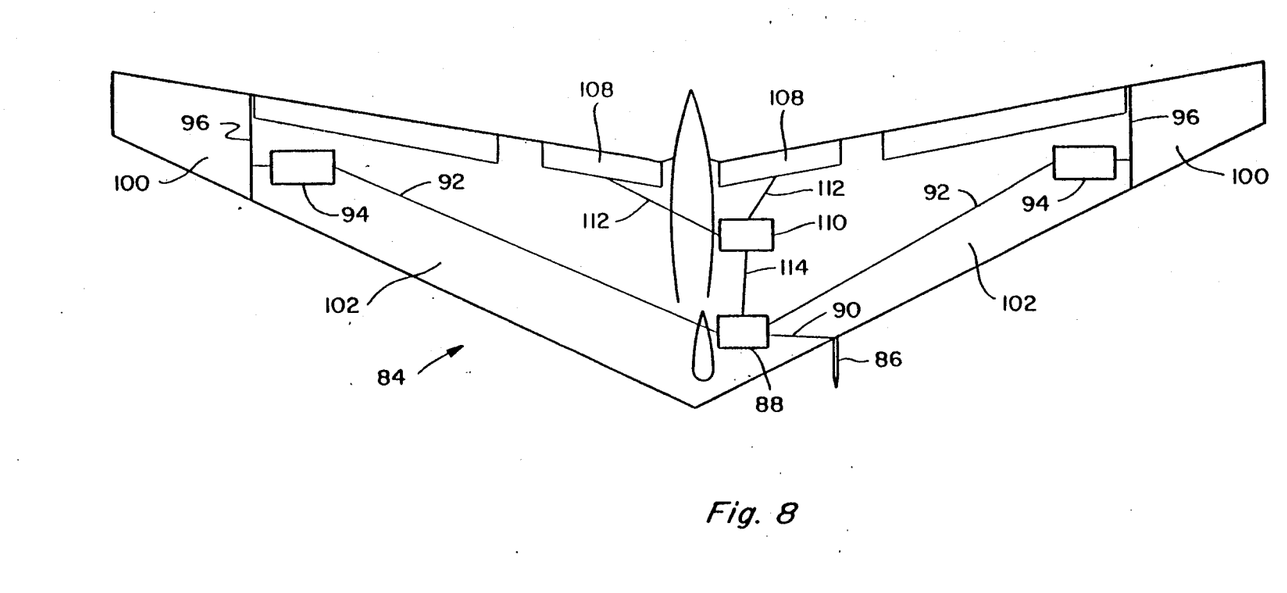
FIG. 8 is a top plan view of a flying wing aircraft showing another embodiment of the present invention.
Figure 9:
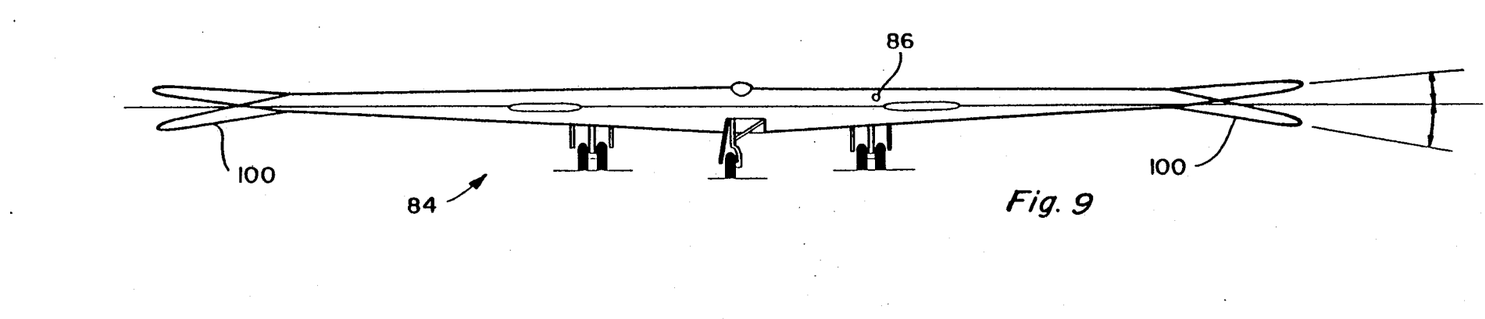
FIG. 9 is a front elevational view of the all wing aircraft of FIG. 8 showing the range of movement of the dihedral panels associated therewith.

FIGS. 8 and 9 show another embodiment 84 of the present invention incorporated into a flying wing type aircraft such as the XB-35 and XB-49 prototype flying wing aircraft and the more recent B-2 prototype bomber aircraft presently under development. In the embodiment 84, the lift coefficient data is inputted to the present system through one or more angle-of-attack sensing vanes such as the vane 86. Angle-of-attack sensors similar to the sensing vane 86 are well known in the industry and are strategically located on the aircraft so as to constantly monitor and measure the angle-of-attack of the aircraft. This data is normally transmitted to an angle-of-attack indicator or other instrument or on-board computer for pilot use and such instrumentation usually presents both a visual as well as a audio indication in the cockpit of optimum aircraft flight conditions.

Measurement of the aircraft angle-of-attack can be accomplished in a variety of ways. For example, in the F-4C and F-4D aircraft, such measurement of the aircraft angle-of-attack is accomplished by means of a slotted probe protruding through the fuselage skin. Airflow direction is sensed by means of a pair of parallel slots in the probe. When the airflow changes direction, pressure in one slot becomes greater than the other, and the probe rotates to align the probe slots with the airflow. Probe rotation moves three potentiometer wiper arms producing electrical resistance variations. The resistance variations comprise the signal which is sent to the angle-of-attack indicator in the cockpit. The indicator is calibrated from 0 to 30 in arbitrary units, such units being equivalent to a range of −10 to +40 angular degrees of probe rotation.

Besides the angle-of-attack indicator, the angle-of-attack system may likewise include both a visual indexer light display as well as an aural tone system for additionally providing angle-of-attack information to the pilot. For example, the angle-of-attack indexers provide continuous angle-of-attack visual indication of optimum aircraft flight conditions by illuminating symbolic cutout symbols in the cockpit of the aircraft, namely, a low-speed symbol, and on-speed symbol and a high-speed symbol. The indexer lights display angle-of-attack information continuously during flight and provide a visual means for the pilot to quickly and readily ascertain such information. In addition, the angle-of-attack system may likewise provide a continuous aural indication of angle-of-attack by means of an aural tone generator. In this particular situation, in response to the angle-of-attack transmitter input signal, the generator produces an aural signal in the headsets of the crew members to describe the aircraft's angle-of-attack. The angle-of-attack sensing vane 86 described in conjunction with the present invention illustrated in FIGS. 8 and 9 is representative of such an angle-of-attack system as described above.

The angle-of-attack sensing vane 86 is responsive to changes in the angle-of-attack of the airfoil in relationship to the relative wind. The flight conditions of stall, landing approach, takeoff, range, endurance, etc., all occur at specific lift coefficients, and therefore, at specific angles-of-attack. Optimum angle-of-attack is not affected by gross weight, bank angle, load factor, airspeed, density altitude, or airplane configuration. For example, the optimum angle-of-attack for landing approaches is always the same, regardless of gross weight. Airspeeds automatically vary to compensate for the change in weight. Typical lift curves for one particular airfoil design, both with and without the use of flaps, is illustrated in FIG. 10. As can be seen from FIG. 10, the lift coefficient $C_L$ is directly proportional to the angle-of-attack of the airfoil. As the angle-of-attack of the airfoil changes, so does the amount of lift being produced by such airfoil and, consequently, so does the lift coefficient associated therewith. Therefore, as can be seen from FIG. 10, a change in the angle-of-attack of the airfoil is directly related to the change in the lift coefficient associated therewith. Lift coefficient data can therefore be directly inputted to the present system throughout the entire flight envelope of the aircraft from the angle-of-attack sensing vane 86.

Changes in the aircraft's angle-of-attack in response to the pilot's input to the various flight control surfaces is read or sensed by the angle-of-attack sensor 86 and thereafter fed to the apportioning device 88 through transmission means illustrated by line 90 in FIG. 8. Means for inputting the angle-of-attack data from the sensor 86 to an appropriate apportioning device 88 or other means is well known in the art and is preferably accomplished through electrical means by inputting such data into the apportioning device 88 in the form of a signal representative of the angle-of-attack of the aircraft. In this regard, the device 88 could be an on-board computer, a microprocessor, or other equivalent type means. It is also recognized that such angle-of-attack data can be inputted to the apportioning device 88 through mechanical, hydraulic, pneumatic or other means as previously indicated. Once the lift coefficient data via the angle-of-attack vane 86 is inputted to the apportioning device 88, the apportioning device, in response to such lift coefficient data, sends an appropriate signal to the wing dihedral panel actuator means 94 through the transmission means illustrated by line 92 in FIG. 8. It is understood that the apportioning device 88 can be programmed or otherwise calibrated as previously explained with reference to the pitch trim embodiment illustrated in FIGS. 3-5 so as to command the appropriate amount of deflection necessary to maintain the desired rolling moment coefficient.

The construction and operation of the dihedral panel actuators 94 are substantially similar to that previously described with respect to the actuating means shown in FIGS. 7 and 7A and, as previously indicated, any suitable means for activating the actuators 94 via transmission means 92 such as mechanical, electrical, electromagnetic, hydraulic, or pneumatic may be utilized. Also, the hinging of the dihedral panels 100 to the main wing portions 102 as well as the mounting and positioning of the dihedral panel actuators 94 may be accomplished in a manner substantially similar to the construction and attachment of the panels 12 and respective actuating means to the main wing portions 14 previously described with respect to FIGS. 6, 7 and 7A. As with the actuators 60, reciprocal movement of the piston arm associated with the actuators 94 will cause appropriate pivotal deflection of the panels 100 along hinge line 96.

An airfoil's lift coefficient is also affected and changed when auxiliary devices such as flaps, leading edge slats, boundary layer control means, variable camber, and other lift control devices are activated. Such auxiliary type devices are essentially, but not always, movable elements associated with the airfoil of the aircraft that may permit the pilot to change the geometry and aerodynamic characteristics of such airfoil to control the motion of the aircraft o to improve the performance thereof in some desired manner. This change in geometry and aerodynamic characteristics of the airfoil produces a corresponding change in the lift curve associated with such airfoil when such auxiliary devices are extended and retracted. For example, FIG. 10 represents a typical plot of lift coefficient versus angle-of-attack for a particular airfoil, lift curve "A" representing the lift characteristics of the particular airfoil with no flaps deflected, lift curve "B" representing the lift characteristics of the airfoil with 20° of flaps extended, and lift curve "C" representing the lift characteristics of the airfoil with 40° flaps extended. As can be seen from FIG. 10, the use of flaps shifts lift curve "A" to the left and it also increases the maximum lift coefficient obtainable from the particular airfoil before stall. This means that if the angle-of-attack of the aircraft is held constant and flaps are extended, the lift coefficient associated with such airfoil will increase. This can be seen by viewing line 104 in FIG. 10 which represents a constant angle-of-attack of approximately 6°. Similarly, if the lift coefficient of the airfoil is held constant and flaps are extended, the angle-of-attack of the aircraft will change accordingly to maintain the desired lift coefficient. This can be seen by viewing line 106 in FIG. 10 which represents a constant lift coefficient of approximately 0.6 wherein, for example, with 20° of flap extended, the angle-of-attack is reduced from approximately +5° to 0°. The apportioning device of the present invention must therefore be designed to correct this 5° shift in angle-of-attack as described below.

Since flap deflection directly affects the lift coefficient of the airfoil as discussed above, lift coefficient data can also be inputted to the present system upon activation of the particular flap mechanism associated with the aircraft. This can be accomplished through the use of well known means such as the flap position sensor means 110 shown in FIG. 8. The flap position sensor 110 reads the position of the respective flaps 108 via transmission means illustrated by lines 112 and thereafter produces a signal or other response representative of the change in lift coefficient of the wing due to movement of the flaps 108. This signal or other response is then fed to the apportioning device 88 through transmission means illustrated by line 114. Again, means for inputting the change of wing lift coefficient due to flap movement to the apportioning device 88 is well known in the art and is preferably accomplished through electrical means as previously discussed. Similarly, it is recognized that such lift coefficient data can also be inputted to the apportioning device 8 through other means such as mechanical, hydraulic or pneumatic. Once the lift coefficient data via sensing means 110 is inputted to the device 88, the device 88 will again send an appropriate signal or other response to the wing dihedral panel actuators 94 so as to command an appropriate amount of deflection necessary to maintain the desired effective dihedral and rolling moment coefficient based upon flap movement. As previously explained, the apportioning device 88 can be programmed or otherwise calibrated to command the desired amount of dihedral panel deflection based upon changes in the wing lift coefficient due to flap movement. In essence, the apportioning device 88 can correct or make a corresponding change to the lift coefficient data received from the angle-of-attack vane due to flap deflection. Calibration of the apportioning device 88 based upon lift coefficient data inputted via the flap sensor means 110 can likewise be accomplished by solving well known aerodynamic design equations.

Besides inputting lift coefficient data from activation of the flaps associated with a particular aircraft, it is also recognized and anticipated that lift coefficient data may also be inputted to the present system from the activation of other auxiliary devices such as from the activation of slats, spoilers and boundary layer control mechanisms. Still further, the slope of lift curves for those curves representing aircraft wings which vary their sweep in flight such as the F-111 and F-14 aircraft may also be changed, thereby also producing a corresponding change in lift coefficient depending upon the particular sweep angle selected. This means that if, for example, the angle-of-attack of the aircraft is held constant and the wing sweep is reduced, the lift coefficient associated with such airfoil will increase. Conversely, if angle-of-attack is held constant and wing sweep is increased, the lift coefficient of the airfoil will decrease. Lift coefficient data from these additional auxiliary devices including lift coefficient data responsive to changes in wing sweep can likewise be accomplished in a manner substantially similar to that disclosed with respect to inputting such data from the use of flaps. Regardless of the particular type of auxiliary device utilized, means associated with such auxiliary type device will produce a signal or other response representative of the change in wing lift coefficient due to movement of such auxiliary device, or due to changes in wing sweep, and such signal will be inputted to the apportioning device 88, which device will analyze such signal and, based upon appropriate programming, calibration, or other means, will command appropriate movement of the dihedral panels 100 so as to maintain the desired effective dihedral and rolling moment coefficient. It is also anticipated that even more complicated system arrangements to include lift coefficient inputs from deflection of the maneuvering control surfaces of the aircraft can be achieved and likewise inputted to the appropriate apportioning device.

Since the angle-of-attack sensor 86 constantly and automatically monitors and measures the angle-of-attack of the aircraft throughout flight, unlike the embodiment of the present invention illustrated in FIGS. 3-5 which receives its lift coefficient data through pilot input by activation of the pitch trim control switch 16, no pilot input per se is needed when the present system is coupled directly to an angle-of-attack sensing system. This means that the dihedral panels 100 illustrated in FIGS. 8 and 9 will be automatically manipulated to maintain a relatively constant overall effective dihedral and, hence, a relatively constant rolling moment coefficient, throughout the entire flight of the aircraft based upon its particular flight condition and maneuvering. This represents a substantial improvement over the embodiment illustrated in FIGS. 3-5.

Since the roll and yaw stability coefficients associated with a flying wing type aircraft such as the all wing aircraft illustrated in FIGS. 8 and 9 are much more sensitive to changes in the rolling moment coefficient caused by the sweep of the wings as compared to conventionally designed swept-wing aircraft which include a tail or empennage section for controlling lateral and directional stability, the present means for maintaining a desired relationship between roll and yaw stability by varying dihedral as a function of lift coefficient is particularly adaptable for use on such all wing aircraft. This is true because the present invention enables a designer to achieve a desired rolling moment coefficient by using the existing surface area of the wing, namely, the movable dihedral panels themselves which form a portion thereof, to compensate for and correct any roll-yaw instability in the overall design. This is particularly advantageous since the use of an extra large drag-producing empennage or tail section detracts from the aerodynamic characteristics of an all wing type aircraft.

Thus, there has been shown and described several embodiments of a novel means for maintaining a desired relationship between roll and yaw stability in a swept wing aircraft by varying dihedral as a function of lift coefficient, which means fulfill all the objects and advantages sought therefor. Many changes, modifications, variations and other uses and applications of the present means will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. In a swept-wing aircraft having wing sections extending in opposite directions from a particular location on said aircraft, each of said wing sections having fist and second wing portions, each of said second wing portions being angularly movable relative to said first wing portions, actuating means on said aircraft operatively connected to each of said second wing portions energizable to produce angular movement relative to said first wing portions, the improvement comprising means for sensing the aerodynamic lift coefficient of said wing sections at a particular point in time during flight, means for producing a signal representative of the aerodynamic lift coefficient of said wing sections including changes in said lift coefficient due to changes in the flight condition of said aircraft, and means responsive to said signal for controlling and energizing said actuating means to produce a change in the angular relationship between said first and second wing portions, said change in the angular relationship between said first and second wing portions being responsive to changes in the lift coefficient of said wing sections so as to maintain the overall Effective Dihedral of said swept-wing aircraft relatively constant for each incremental change in lift coefficient through the designed flight envelope of said aircraft, whereby such responsive movement of said second wing portions relative to said first wing portions to maintain the overall Effective Dihedral of said swept-wing aircraft relatively constant likewise simultaneously maintains the rolling moment coefficient of said swept-wing aircraft relatively constant for each incremental change in lift coefficient throughout the designed flight envelope of said aircraft thereby further simultaneously maintaining a desired ratio between the rolling moment coefficient and the yawing moment coefficient of said swept-wing aircraft for each incremental change in lift coefficient throughout the designed flight envelope of said aircraft.

2. The improvement defined in claim 1 wherein said means for producing a signal representative of the aerodynamic lift coefficient of said wing sections includes an angle-of-attach sensing vane.

3. The improvement defined in claim 1 including pitch trim control means associated with said aircraft, said means for producing a signal representative of the aerodynamic lift coefficient of said wing sections including means responsive to activation of said pitch trim control means.

4. The improvement defined in claim 1 wherein said actuating means includes hydraulically operated actuator means.

5. The improvement defined in claim 1 wherein said actuating means includes electrically operated actuator means.

6. The improvement defined in claim 1 wherein said actuating means includes pneumatically operated actuator means.

7. The improvement defined in claim 1 wherein said actuating means includes mechanically operated actuator means.

8. The improvement defined in claim 1 wherein said actuating means includes electro-magnetically operated actuator means.

9. The improvement defined in claim 1 wherein said aircraft includes at least one auxiliary lift type device associated with said wing sections, said auxiliary device being movable relative to said wing sections to change the aerodynamic characteristics thereof, changes in the lift coefficient of said wing sections due to changes in the fight condition of said aircraft being effected by movement of said auxiliary device.

10. The improvement defined in claim 9 wherein said auxiliary lift type device includes flap means associated with each of said wing section.

11. In a swept-wing aircraft having opposite wing members, each wing member having an inboard and an outboard wing portion, means hingedly attaching said outboard wing portions to said inboard wing portions for angular movement relative to each other, rive mans operatively connected to said outboard wing portions for controlling the movement of said outboard wing portions relative to said inboard wing portions, the improvement comprising means for maintaining a desired relationship between the roll and yaw stability coefficients of said aircraft for all changes in angle-of-attach throughout at least a portion of its flight envelope, said means for maintaining including sensing means responsive to the angle-of-attack of said wing members for a given flight condition during flight, means operatively connected to said sensing means for producing a response representative of the particular angle-of-attack of said wing members including changes in said angle-of-attack due to changes in the flight condition of said aircraft, and means responsive to responsive for activating said drive means to change the angular relationship between said inboard and outboard wing portions, said change in the angular relationship between said inboard and outboard wing portions being responsive to changes in the angle-of-attack of said wing members so as to maintain the overall Effective Dihedral of said swept-wing aircraft substantially constant for all changes in angle-of-attack throughout at least a portion of its flight envelope, said responsive movement of the outboard wing portions relative to the inboard wing portions likewise maintaining the rolling moment coefficient of said swept-wing aircraft substantially constant for all changes in angle-of-attack throughout at least a portion of the flight envelope of said aircraft, whereby said changes in the angular relationship between said inboard and outboard wing portions simultaneously maintain the desired relationship between the roll and yaw stability coefficients of said swept-wing aircraft.

12. The improvement defined in claim 11 wherein said means responsive to said response for activating said drive means includes hydraulic means.

13. The improvement defined in claim 11 wherein said means responsive to said response for activating said drive means includes electrical means.

14. The improvement defined in claim 11 wherein said means responsive to said response for activating said drive means includes pneumatic means.

15. The improvement defined in claim 11 wherein said means responsive to said response for activating said drive means includes mechanical means.

16. The improvement defined in claim 11 wherein said means responsive to said response for activating said drive means includes electro-magnetic means.

17. The improvement defined in claim 11 including at least one auxiliary lift type device associated with the wing members of said aircraft, said auxiliary device being energizable to cause a change in the lift coefficient of said wing members, means for producing a response representative of the change in lift coefficient of said wing members due to the energizing of said auxiliary device, and means responsive to the above-named response for activating said drive means to change the angular relationship between said inboard and outboard wing portions in response to the changes in said lift coefficient due to the energizing of said auxiliary device.

18. The improvement defined in claim 17 wherein said auxiliary lift type device includes flap means associated with each of said wing members.

19. The improvement defined in claim 11 wherein said sensing means responsive to the angle-of-attack of said wing members includes an angle-of-attack sensing unit.

20. The improvement defined in claim 11 wherein said aircraft includes a pitch trim control mechanism having at least a portion thereof movable to control the pitch condition of said aircraft, said sensing means responsive to the angle-of-attack of said wing members including means responsive to movement of said pitch trim control mechanism.

21. The improvement defined in claim 20 wherein said means operatively connected to said means responsive to movement of said pitch trim control mechanism includes a member operatively connected to actuator means associated with said pitch trim control mechanism, said member being operatively connected to said second wing portions to change the angular relationship between said first and second wing portions in response to movement of said pitch trim control mechanism.

22. In a swept-wing aircraft having opposite wing members each including first and second wing portions, said second wing portions being pivotally mounted to said first wing portions, and means operatively connected to each of said second wing portions for effecting angular movement thereof relative to said first wing portions, the improvement comprising means for maintaining a desired ratio between the rolling moment derivative due to sideslip and the yawing moment derivative due to sideslip of said swept-wing aircraft for all changes in lift coefficient throughout its designed flight envelope, said means including means for producing a signal representative of the changes in the lift coefficient of said wing members during flight, and means responsive to said signal for activating said means for effecting movement of said second wing portions so as to change the angular relationship between said first and second wing portions, said change in the angular relationship between said first and second wing portions being responsive to the changes in said lift coefficient so as to maintain the overall Effective Aerodynamic Dihedral of said swept-wing aircraft substantially constant for all changes in lift coefficient throughout the designed flight envelope of said aircraft, said responsive movement of the second wing portions relative to the first wing portions simultaneously maintaining the rolling moment coefficient of said swept-wing aircraft substantially constant for all changes in lift coefficient throughout the designed flight envelope of said aircraft, whereby said changes in the angular relationship between said first and second wing portions simultaneously maintain the desired relationship between the rolling moment and yawing moment derivatives of said swept-wing aircraft due to sideslip wherein $$\Gamma_{eff} = \frac{dC_l/d\beta}{-.0002}$$

where
$\Gamma_{eff}$ = effective dihedral
$dC_l/d\beta$ = rolling moment derivative
$Cl$ = rolling moment coefficient
$\Gamma$ = sideslip angle;
and wherein, $$\begin{aligned}
dC_l/d\beta = &\ [-2\ \Gamma_1/57.3 \times dC_L/d\alpha \times \overline{y_1}/b \times S\ \Gamma_1/S] + \\
&\ [-2\ \Gamma_2/57.3 \times dC_L/d\alpha \times \overline{y_2}/b \times S\ \Gamma_2/S] + \\
&\ [-C_L/57.3 \times \overline{y_1}/b \times \sin 2\Lambda \times S\ \Gamma_1/S] + \\
&\ [-C_L/57.3 \times \overline{y_2}/b \times \sin 2\Lambda \times S\ \Gamma_2/S]
\end{aligned}$$

where
$\Gamma_1$ = dihedral of inner wing panel
$\Gamma_2$ = dihedral of outer wing panel
$\overline{y1}$ = spanwise distance from wing centerline to the centroid of area of inner wing panel
$\overline{y2}$ = spanwise distance from wing centerline to the centroid of area of outer wing panel
$S\Gamma_1$ = area of inner wing panel having dihedral
$S\Gamma_2$ = area of outer wing panel having dihedral.

23. In a swept-wing aircraft having opposite wing members, each wing member having first and second wing portions, means hingedly attaching said second wing portions to said first wing portions for angular movement relative to each other, drive means operatively connected to said second wing portions for controlling the movement of said second wing portions relative to said first wing portions, the improvement comprising means for maintaining a plurality of desired ratios between the roll and yaw stability coefficients of said aircraft based upon changes in the lift coefficient throughout respective portions of the flight envelopes of said aircraft, each plurality of said desired ratios corresponding to a respective portion of said flight envelope, said means for maintaining including sensing means responsive to changes in the lift coefficient of said wing members during flight, means operatively connected to said sensing means for producing a response representative of the changes in the lift coefficient of said wing members during flight, and means responsive to said response for activating said drive means to change the angular relationship between said first and second wing portions, said change in the angular relationship between said first and second wing portions being responsive to said lift coefficient so as to maintain the overall Effective Dihedral of said swept-wing aircraft substantially constant for all changes in lift coefficient throughout a given portion of the flight envelope of said aircraft, said overall Effective Dihedral being maintained at a different constant value for various portions of said flight envelope, said responsive movement of the second wing portions relative to the first wing portions likewise maintaining the rolling movement coefficient of said swept-wing aircraft substantially constant for all changes in lift coefficient throughout a given portion of the flight envelope of said aircraft, said rolling moment coefficient being similarly maintained at a different constant value for various portions of said flight envelope, each of said rolling moment coefficient values being based upon the corresponding overall Effective Dihedral value selected for each respective portion of said flight envelope, whereby said changes in the angular relationship between said first and second wing portions simultaneously maintain a different desired ratio between the roll and yaw stability coefficients of said swept-wing aircraft within each respective portion of said flight envelope.

* * * * *

UNITED STATES PATENT AND TRADEMARK OFFICE
CERTIFICATE OF CORRECTION

PATENT NO. : 5,078,338            Page 1 of 4
DATED : January 7, 1992
INVENTOR(S) : Terrence O'Neill and Timothy O'Neill It is certified that error appears in the above—identified patent and that said Letters Patent is hereby corrected as shown below:

Column 2, line 49, "$DC_\ell/d\beta = 0.0002\Delta\sqrt{\ }$" should be --$dC_\ell/d\beta = 0.0002\Delta\sqrt{\ }$--.

Column 2, line 49, "wind" should be --wing--.

Column 2, line 65, "$dC_\ell d\beta$" should be --$dC_\ell/d\beta$--.

Column 4, line 39, "itch" should be --pitch--.

Column 4, line 58, "Cl = rolling moment coefficient" should be --$C_\ell$ = rolling moment coefficient--.

Equation 2 located at Column 4, lines 62-64, should be set forth as follows:
$$-dC_\ell/d\beta = [-2\sqrt{\ }/57.3 \times dC_L/d\alpha \times \bar{y}/b \times S_{fl}/S] +$$
$$[-C_L/57.3 \times \bar{y}/b \times \sin 2\Lambda \times S_{fl}/S]--.$$

Column 5, line 6, "$S_{64}$" should be --$S_{fl}$--.

UNITED STATES PATENT AND TRADEMARK OFFICE
CERTIFICATE OF CORRECTION

PATENT NO. : 5,078,338
DATED : January 7, 1992
INVENTOR(S) : Terrence O'Neill and Timothy O'Neill It is certified that error appears in the above—identified patent and that said Letters Patent is hereby corrected as shown below:

Equation 3 located at Column 5, lines 12-15, should be set forth as follows:

$$-- dC_\ell/d\beta = [-2\Gamma_1/57.3 \times dC_L/d\alpha \times \bar{y}_1/b \times S_{\Gamma_1}/S] +$$
$$[-2\Gamma_2/57.3 \times dC_L/d\alpha \times \bar{y}_2/b \times S_{\Gamma_2}/S] +$$
$$[-C_L/57.3 \times \bar{y}_1/b \times \sin 2\Lambda \times S_{\Gamma_1}/S] +$$
$$[-C_L/57.3 \times \bar{y}_2/b \times \sin 2\Lambda \times S_{\Gamma_2}/S] --.$$

Column 5, line 20, "$\bar{y}1$" should be --$\bar{y}_1$--.

Column 5, line 22, "$\bar{y}2$" should be --$\bar{y}_2$--.

Column 5, line 24, "$S\Gamma_1$" should be --$S_{\Gamma_1}$--.

Column 5, line 25, "$S\Gamma_2$" should be --$S_{\Gamma_2}$--.

UNITED STATES PATENT AND TRADEMARK OFFICE
CERTIFICATE OF CORRECTION

PATENT NO. : 5,078,338               Page 3 of 4
DATED : January 7, 1992
INVENTOR(S) : Terrence O'Neill and Timothy O'Neill It is certified that error appears in the above—identified patent and that said Letters Patent is hereby corrected as shown below:

Column 7, line 1, "i" should be --is--.

Column 12, line 53, "a" should be --as--.

Column 15, line 2, "o" should be --or--.

Column 17, line 27, "fist" should be --first--.

Column 18, line 25, "fight" should be --flight--.

Column 18, line 34, "rive mans" should be --drive means--

Column 18, line 41, "attach" should be --attack--

Column 20, line 25, "Cl" should be --C$_l$--.

Column 20, line 26, "$f^1$" should be --$f_3$--.

Signed and Sealed this

Thirtieth Day of March, 1993

*Attest:*

STEPHEN G. KUNIN

*Attesting Officer*      *Acting Commissioner of Patents and Trademarks*

UNITED STATES PATENT AND TRADEMARK OFFICE
CERTIFICATE OF CORRECTION

PATENT NO. : 5,078,338
DATED : January 7, 1992
INVENTOR(S) : Terrence O'Neill and Timothy O'Neill It is certified that error appears in the above—identified patent and that said Letters Patent is hereby corrected as shown below:

The equation in claim 22 located at column 20, lines 30-34, should be set forth as follows:

$$-dC_\ell/d\beta = [-2\Gamma_1/57.3 \times dC_L/d\alpha \times \bar{y}_1/b \times S_{\Gamma_1}/S] +$$
$$[-2\Gamma_2/57.3 \times dC_L/d\alpha \times \bar{y}_2/b \times S_{\Gamma_2}/S] +$$
$$[-C_L/57.3 \times \bar{y}_1/b \times \sin 2\Lambda \times S_{\Gamma_1}/S] +$$
$$[-C_L/57.3 \times \bar{y}_2/b \times \sin 2\Lambda \times S_{\Gamma_2}/S] --.$$

Column 20, line 39, "$\bar{y}1$" should be --$\bar{y}_1$--.

Column 20, line 41, "$\bar{y}2$" should be --$\bar{y}_2$--.

Column 20, line 43, "$S/\Gamma_1$" should be --$S_{\Gamma_1}$--.

Column 20, line 44, "$S/\Gamma_2$" should be --$S_{\Gamma_2}$--.